(12) United States Patent
De Rossi et al.

(10) Patent No.: US 8,894,402 B2
(45) Date of Patent: Nov. 25, 2014

(54) APPARATUS FOR VACUUM FOAMING CONTAINERS FOR REFRIGERATION

(75) Inventors: Claudio De Rossi, Abbiategrasso (IT); Fabrizio Pobbiati, Robecco sul Naviguo (IT)

(73) Assignee: Cannon Ergos S.p.A., Milan (IT)

( * ) Notice: Subject to any disclaimer, the term of this patent is extended or adjusted under 35 U.S.C. 154(b) by 508 days.

(21) Appl. No.: 13/271,520

(22) Filed: Oct. 12, 2011

(65) Prior Publication Data
US 2012/0093959 A1   Apr. 19, 2012

(30) Foreign Application Priority Data
Oct. 13, 2010 (IT) .............................. MI2010A1871

(51) Int. Cl.
| B29C 44/42 | (2006.01) |
| B29C 44/34 | (2006.01) |
| B29K 75/00 | (2006.01) |
| B29L 31/00 | (2006.01) |

(52) U.S. Cl.
CPC ......... B29C 44/3403 (2013.01); *B29K 2075/00* (2013.01); *B29L 2031/7622* (2013.01); B29C 44/428 (2013.01)
USPC ............ 425/186; 425/188; 425/190; 425/442

(58) Field of Classification Search
CPC ........ B29C 33/20; B29C 33/26; B29C 44/10; B29C 44/1233
USPC ......... 425/185, 186, 188, 190, 193, 195, 438, 425/441, 442
See application file for complete search history.

(56) References Cited

U.S. PATENT DOCUMENTS

| 4,664,614 A * | 5/1987 | De Rossi ...................... 425/185 |
| 4,691,906 A * | 9/1987 | Zastrow ........................ 425/183 |
| 4,820,372 A | 4/1989 | Gidseg |
| 2008/0029921 A1 | 2/2008 | Corradi et al. |

FOREIGN PATENT DOCUMENTS

| DE | 35 35 625 | 4/1986 |
| DE | 195 46 523 | 6/1997 |
| GB | 1 373 294 | 11/1974 |
| WO | 2006/013002 | 2/2006 |
| WO | 2010/094715 | 8/2010 |

* cited by examiner

*Primary Examiner* — Joseph S Del Sole
*Assistant Examiner* — Thukhanh Nguyen
(74) *Attorney, Agent, or Firm* — Wenderoth, Lind & Ponack, L.L.P.

(57) ABSTRACT

An apparatus for vacuum foaming containers for refrigeration of foodstuffs, in which a polyurethane mixture is injected into hollow walls of a container closed under vacuum condition within a foaming cell. The apparatus includes a main frame for supporting the foaming cell, and an auxiliary frame movable between a lowered opening position and raised closing position of the foaming cell. The foaming cell includes a pallet for supporting a container to be foamed, side shore panels, transversal shore panels, and an internal shore plug member supported by the main frame. The side panels are hingedly connected to slides transversally movable with respect to the auxiliary frame for enabling their distance to be adjusted.

5 Claims, 6 Drawing Sheets

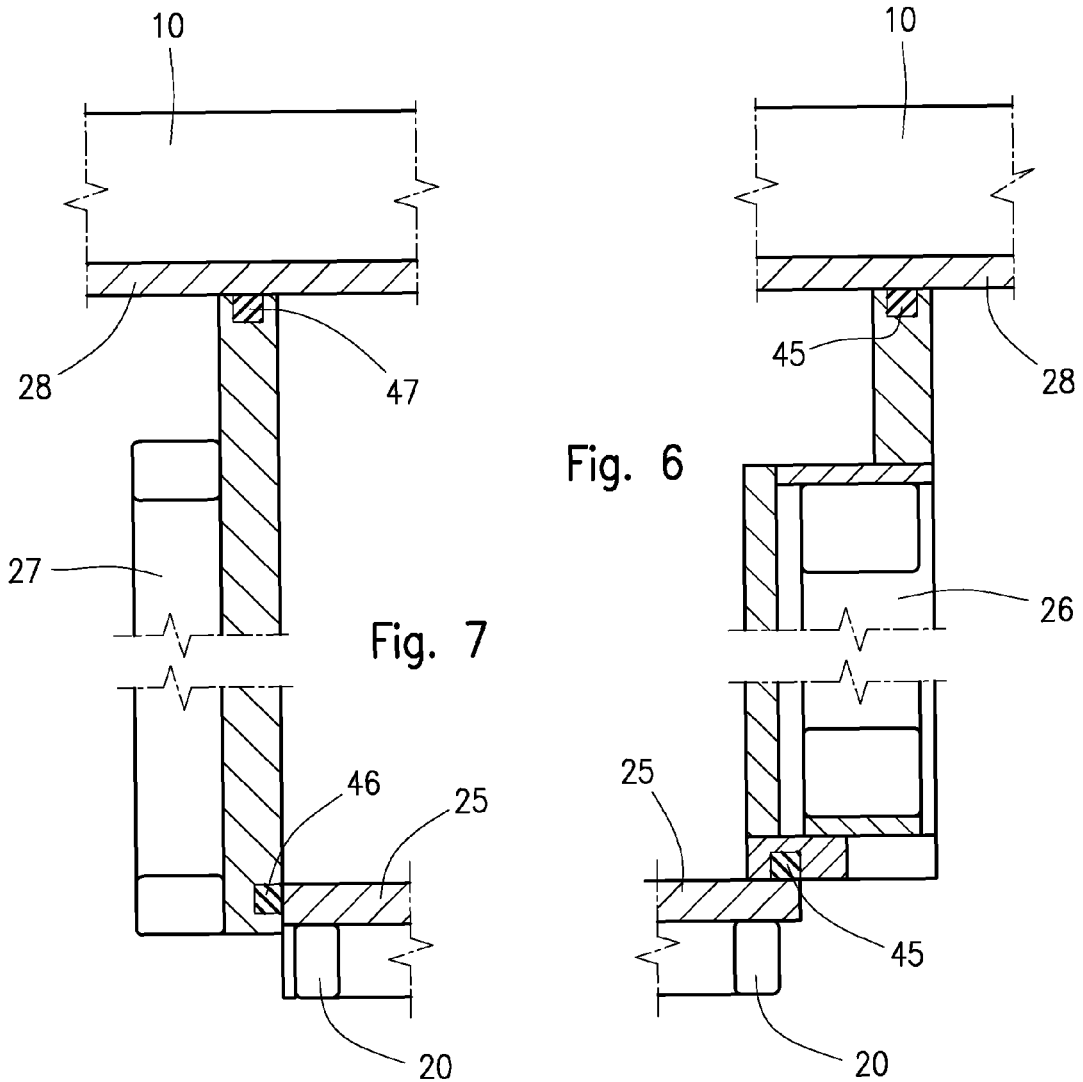
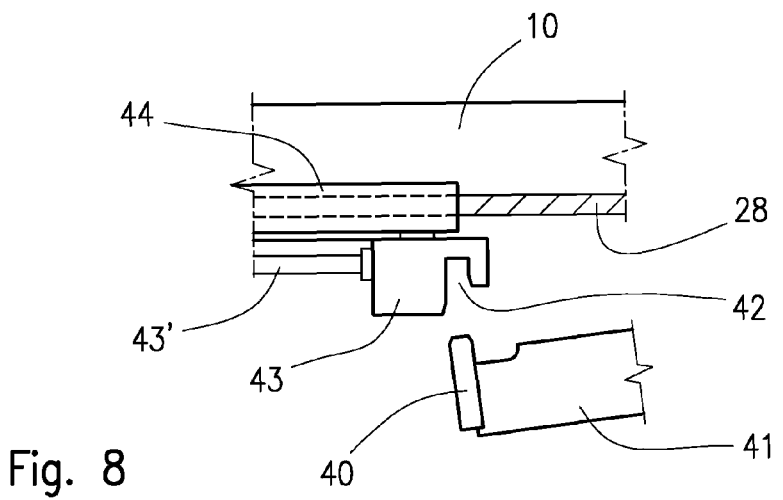

APPARATUS FOR VACUUM FOAMING CONTAINERS FOR REFRIGERATION

BACKGROUND OF THE INVENTION

The present invention relates to an apparatus for foaming under vacuum conditions, or, more simply, for "vacuum foaming", wherein a chemically reactive polyurethane mixture is injected into the hollow walls of containers for refrigeration of foodstuffs, such as refrigerator cabinets for domestic and industrial use, freezers and the like, of the type disclosed in a previous international application WO 2010/094715, of the same applicant, representing the closer prior art.

STATE OF THE ART

Use of vacuum in foaming refrigeration containers was variously proposed for example in WO 2006/013002 and WO 2010/094715, as the vacuum aids and accelerates the foaming of the polyurethane mixture, enabling the use of fast polyurethane formulations and the formation of foams having a structure with small dimension cells, homogeneous density and a better insulation for the whole container.

In particular WO 2006/013002 discloses an apparatus for foaming refrigerator cabinets, comprising a conventional foaming jig that is enclosed within a vacuum chamber configured to enable the opening and the closure of the vacuum chamber and said foaming jig, by a vertical movement of an auxiliary support frame.

In order to improve foaming under vacuum condition, reducing the volumes of air to be sucked, and the times of the manufacturing cycle, with WO 2010/094715 the use was proposed of a foaming cell according to the preamble of claim 1.

Briefly said, the basic concept of the previous patent application lies in the use of a normal jig for opposing the thrust exerted by the polyurethane foam during the expansion step, modifying said normal jig into a vacuum cell, substantially provided with the same dimensions and volume of the container to be foamed.

In this context, the side and transversal panels of the foaming cell were provided with a system of sealing gaskets, suitable for enabling a tight closure of the cell, as required for generating the desired vacuum degree.

However, the arrangement of the shore panels and the sealing gaskets were such to prevent any adjustment of the dimensions of the foaming cell in order to conform said dimensions of the foaming cell to the dimensions of the container to be foamed, unless complex solutions were applied requiring the use of additional shore members that, in turn, had to be applied to the peripheral panels of the foaming cell.

Furthermore, the arrangement of the sealing gaskets was such to prevent any relative movement between the panels of the cell.

OBJECTS OF THE INVENTION

Main object of the present invention is to provide an apparatus for foaming under vacuum condition, according to the previous application WO 2010/094715, the apparatus being however differently configured in order to enable the dimensions of the foaming cell to be quickly and automatically changed, by each time adapting the dimensions of the foaming cell to the transversal and/or longitudinal dimensions of the container to be foamed.

A further object of the invention is to provide an apparatus for foaming under vacuum condition, as previously said, by means of which a single support pallet and a vacuum sealing system can be used for foaming containers of any dimension, enabling at the same time an easy adjustment of the dimensions of the foaming cell, without that the support pallet has to be substituted, or the sealing system has to be modified. Thus, the times required for changing and adjusting the dimensions of the foaming cell are remarkably reduced, with consequent growth of productivity.

SUMMARY OF THE INVENTION

The innovative aspect of the apparatus according to the present invention, lies in providing proper supporting and linking means for the side panels of the foaming cell, so as to enable the mutual distance of said side panels to be adjusted as a function of the dimensions of the refrigeration containers to be foamed, and a particular arrangement of the sealing gaskets suitable for allowing the mutual positions of the panels to be changed, and an air tight closure to be assured in a wide range of adjustment of the side panels, without that the support pallet for the container has each time to be substituted, and the entire apparatus, or portion thereof, to be modified.

In particular, according to the present invention, an apparatus is provided for foaming under vacuum condition a container for refrigeration of foodstuffs, the apparatus comprising:

a main frame provided with vertically extending guide posts;

an auxiliary frame horizontally extending and movably supported between a lower position and an upper position by the posts of the main frame;

a foaming cell configured to air tightly enclose the refrigeration container; the foaming cell comprising:

a support pallet for the refrigeration container, and side shore panels tiltably supported by the auxiliary frame;

transversal panels and an internal shore plug member, being supported by the main frame in a position overlying the auxiliary frame;

first control means for moving the auxiliary frame with the support pallet between said lower position and said upper position, in an open condition and respectively in a closed condition of the foaming cell; and sealing gaskets between the shore panels, the pallet and an upper closure member;

characterized in that the side panels are hingedly connected to slide members transversally movable to the auxiliary frame; and second control means for adjustably moving the slide members and the side panels between a retracted position and advanced positions in respect to the pallet;

the sealing gaskets of the side panels being configured and positioned along peripheral edges of the side panels, to come into contact with flat sealing surfaces of the pallet, the transversal panels and the upper closure member, in any adjusted position between said retracted and advanced positions of the side panels of the cell.

According to a further characteristic, the apparatus comprises an additional shore panel, movably supported by the main frame, in a longitudinal direction, at one end inside the cell.

BRIEF DESCRIPTION OF THE DRAWINGS

These and further objects and features of the apparatus according to the invention, will be more clear from the following description, with reference to the example of the enclosed drawings, wherein:

FIG. 6 shows the sealing means of one of the side panels;

FIG. 7 shows the sealing means of one of the transversal panels;

FIG. 8 shows a device for locking the side panels to the upper portion of the main frame.

DETAILED DESCRIPTION OF THE INVENTION

Figure 1:
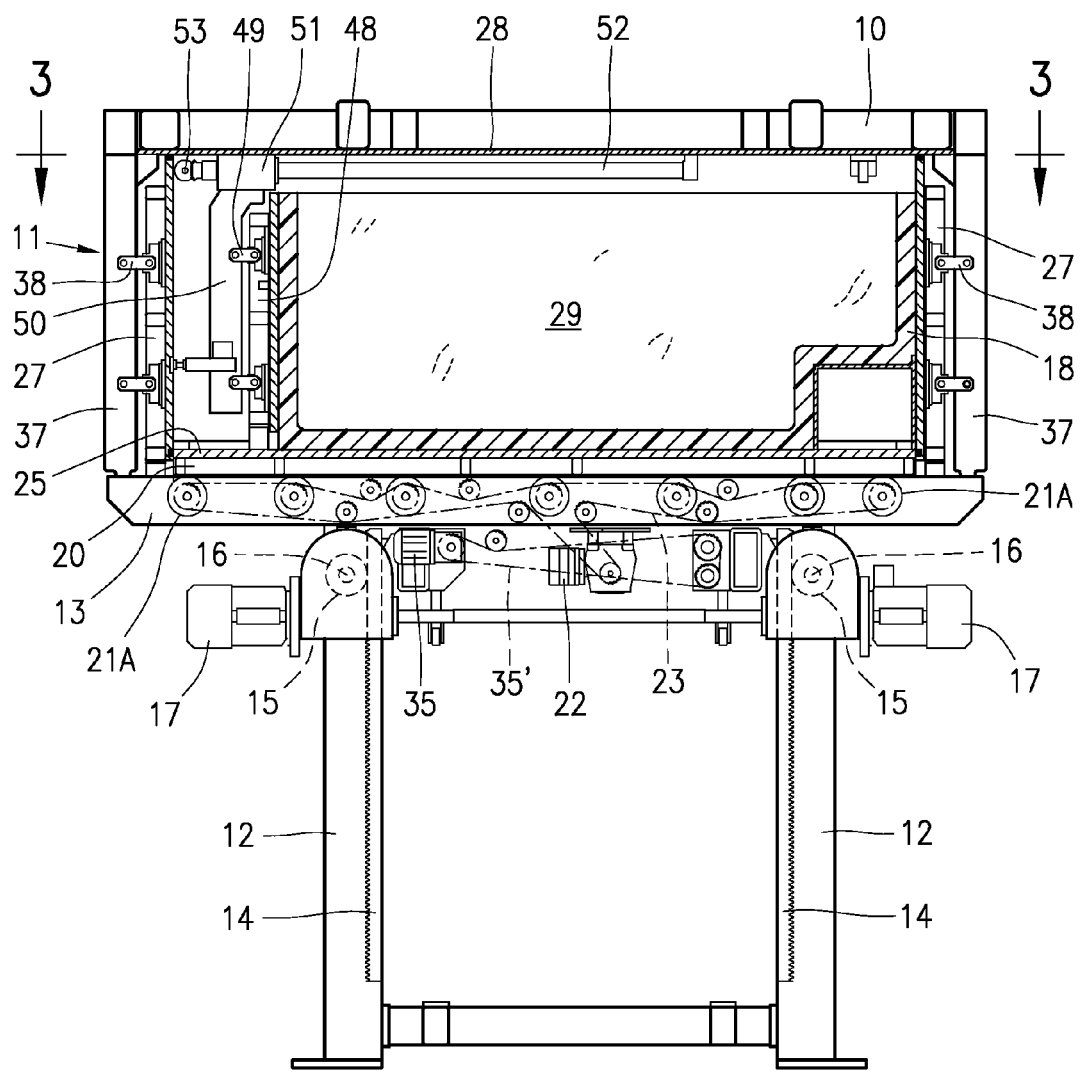
FIG. 1 is a longitudinal cross-sectional view, in the closed condition of the foaming cell.
Figure 2:
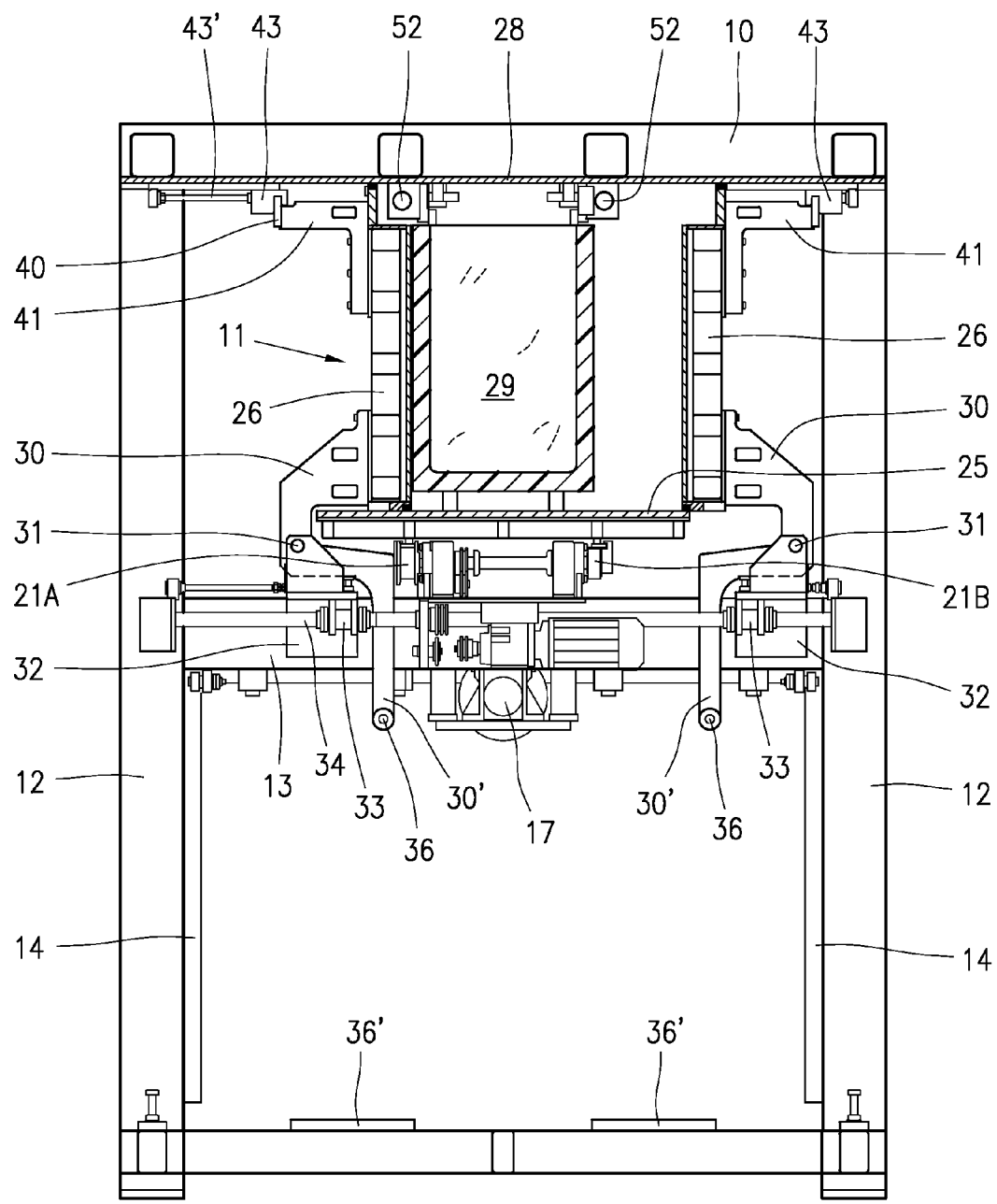
FIG. 2 is a cross section of FIG. 1.
Figure 4:
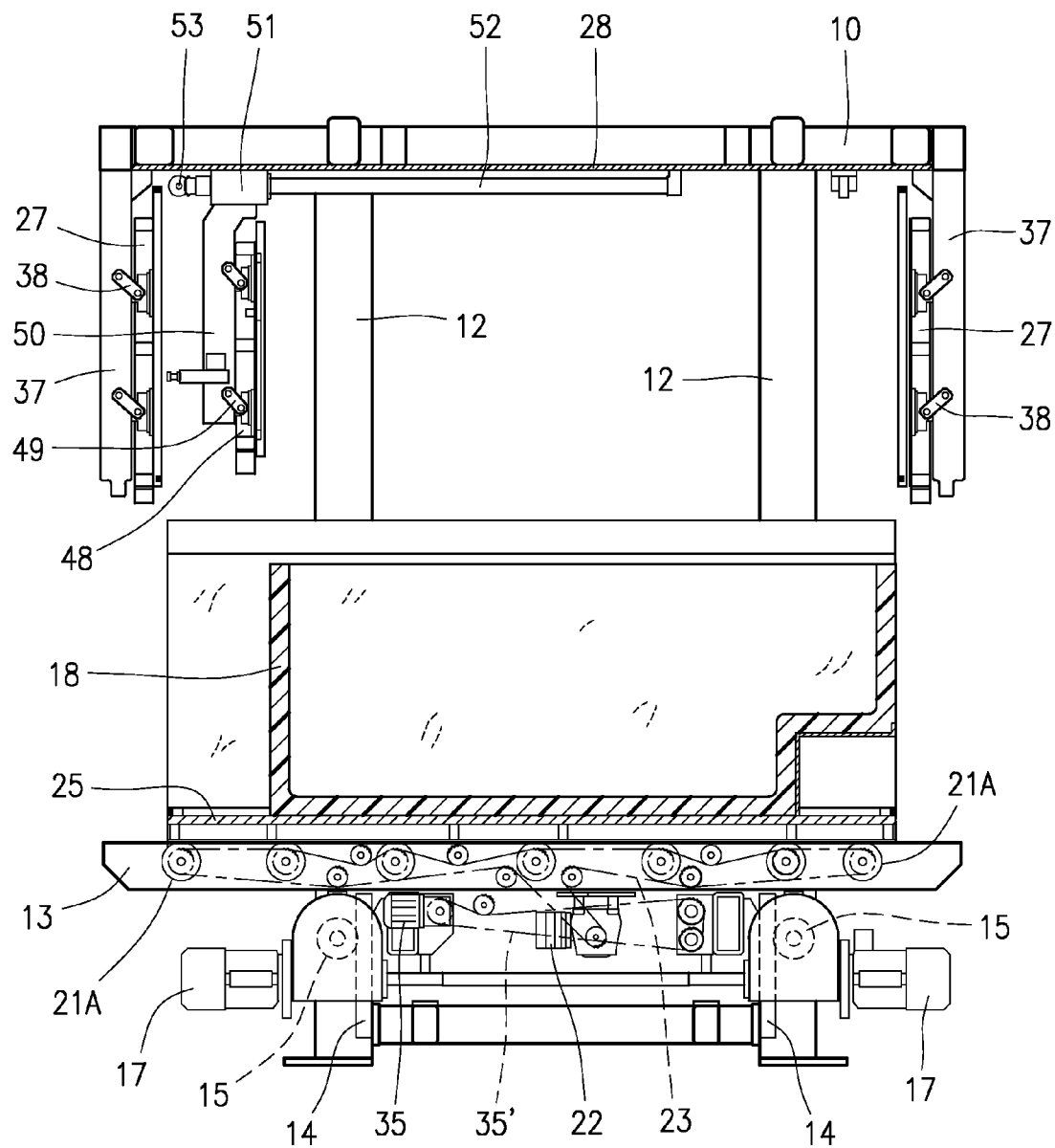
FIG. 4 is a longitudinal cross-sectional view similar to FIG. 1, with the foaming cell in the open condition.
Figure 5:
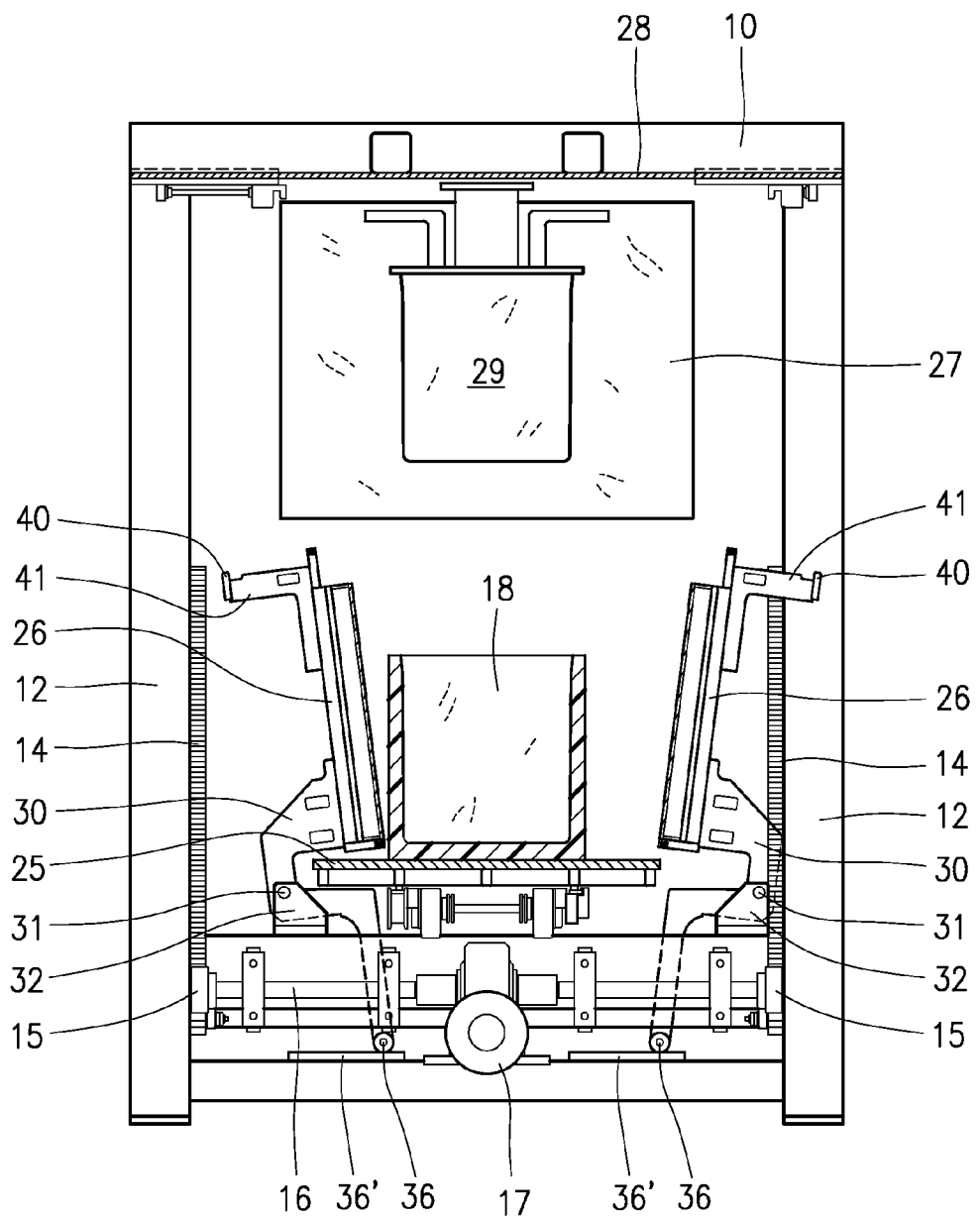
FIG. 5 is a cross section of FIG. 4.

According to the example under consideration, the apparatus for foaming under vacuum condition containers for refrigeration and/or preservation of foodstuffs, such as refrigerators for domestic or industrial use, freezers or similar, comprises a main frame 10 for supporting a foaming cell 11, the main frame 10 being provided with four vertical guide posts 12 for a horizontal auxiliary frame 13; the auxiliary frame 13 is vertically movable between a raised position, with the foaming cell 11 in a closed condition, as shown in FIGS. 1 and 2, and a lowered position, with the foaming cell 11 in an open condition, as shown in FIGS. 4 and 5.

The vertical movement of the auxiliary frame 13 can be obtained by any control device. In the shown case, the vertical movement of the frame 13 is obtained by means of first control means comprising a rack 14 on each guide post 12, engaged by a motor driven gear wheel 15; as shown in FIGS. 1 and 5, the gear wheels 15, positioned at opposite sides of the main frame 10, are connected to a transversal shaft 16, operatively connected to a respective electric motor 17 fastened to the frame 13. The two control motors 17 are synchronously driven in order to move the frame 13 by holding a horizontal condition.

The apparatus further comprises a foaming cell 11, for containing a refrigeration container, schematically indicated by 18, provided with hollow walls into which a foamable polyurethane mixture has to be injected, for example by a high-pressure mixing head, not shown, in a per se known manner, for example from the previous patent applications of the same applicant.

As shown in FIGS. 1 to 5, the foaming cell 11 comprises a support pallet 20 for the container 18; the pallet 20 is in turn slidably supported by the horizontal frame 13 in order to be moved, together with an already foamed or still to be foamed container 18, between an internal and an external position in respect to the foaming cell.

The horizontal movement of the pallet 20 along the support frame 13, can be obtained by any control means, for example by means of a roller conveyor or a suitable conveyor system; in the shown case, a plurality of pairs of driving rollers 21A, 21B were used, operatively connected to a driving motor 22 by a chain 23, or in other suitable manner.

The support pallet 20 for the refrigeration container 18 comprises a plane structure consisting of mutually and firmly connected tubular profiled beams, over which a strong metal plate 25 is fastened over the full length and width of the pallet; the metal plate 25 defines a continuous upper planar surface of the pallet 20, required for establishing a sealing closure with the panels of the foaming cell, as explained in the following.

The cell 11 is configured to enable a polyurethane mixture to be foamed under vacuum condition within the hollow walls of a refrigeration container 18 enclosed into said cell. For the objects of the present description, with "foaming under vacuum condition" a closed condition of the cell 11 is intended wherein, before or during the injection of the polyurethane mixture, a reduction of the pressure to a value lower than the atmospheric pressure, is generated in said cell and consequently in the hollow walls of the container 18 by suction of air, for example a reduction of the pressure ranging between 10% and 40%, preferably between 20% and 30%.

The foaming cell 11, as shown in the FIGS. 1 to 6, in addition to the bottom pallet 20, comprises four peripheral shore panels, to contact external surfaces of the side walls of the container 18; said foaming cell 11 comprises in particular two side panels 26, shown in FIG. 2, parallely arranged to the longitudinal axis of the cell 11, and two transversal panels 27, shown in FIG. 1, wherein the side panels 26 and the transversal panels 27 have, on the internal side of the cell 11, a strong metallic plate and wherein, in the closed condition of the foaming cell 11 shown in the FIGS. 1 and 2, said side panels 26 and said transversal panels 27 tightly extend between the lower pallet 20 and an upper closure member consisting, for example, of a strong metallic plate 28 upwardly fastened to the main frame 10.

Lastly the foaming cell 11 comprises an internal shore plug member 29 removably fastened to the main frame 10; the shore plug member 29 is shaped to adhere to internal surfaces of the refrigeration container 18.

Figure 3:
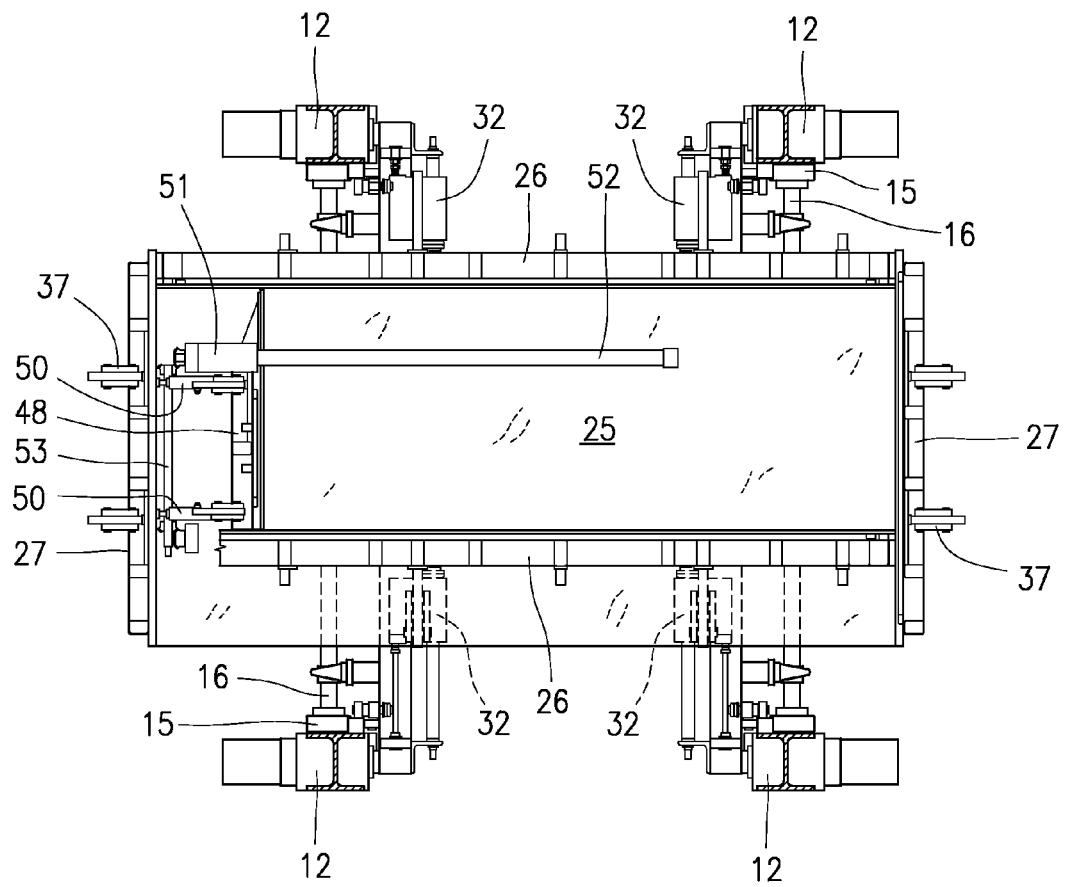
FIG. 3 is a plan view according to line 3-3 of FIG. 1.

According to a first aspect of the invention, as shown in FIGS. 2, 3 and 4, the side panels 26 longitudinally extend in respect to the foaming cell 11 and are movably supported so that their mutual distance can be adjusted depending on the dimensions of the containers 18 to be foamed; the position of the two side panels 26 can be finely adjusted between a fully retracted condition, and a fully advanced condition in respect to the pallet 20. For clarity, in FIGS. 2, 3 and 4, the right panel 26 is shown in the fully retracted position, suitable for containers 18 of largest dimensions, whereas the left panel 26 is shown in the fully advanced position, suitable for containers 18 of smallest dimensions; thus, it is apparent that by properly adjusting the position and the distance between the side panels 26, a same cell can be used for foaming refrigeration containers 18 of different dimensions, without requiring any substantial modification to the apparatus, the changing operations being carried out in automatic mode and very reduced times.

In this regard, as shown in FIGS. 2, 3 and 5, each of the side panels 26 is fastened to two rocking arms 30, FIG. 4, each of which arms being hingedly connected in 31 to a slide member 32, that is driven to slide in a direction transversal to the longitudinal direction of the frame 13 and the pallet 20. In particular, each slide 32 moves on a guide surface of the frame 13; and is fastened to a nut screw 33 that is operatively connected to slide along a driven shaft 34 transversally extending to the frame 13; each shaft 34 is provided with a screw thread, i.e. a right-hand screw thread and a left-hand screw thread, in order to simultaneously control two opposite slide members 32 to move close and away to each other, to which opposite slide members 32 for the support arms 30 of the two side panels 16 are linked; each shaft 34 is operatively connected to a drive motor 35, by a suitable transmission 35'.

Each rocking arm 30 has a C-like conformation that downwardly extends with a lever 30' substantially coplanar to the side panel 26; at the lower end the lever 30' is provided with a roller 36 to contact and slide along an underlying stop member 36', during the adjustment of the position of the side walls 26. Thus, when the auxiliary frame 13 results fully lowered in the position of FIGS. 4 and 5, the roller 36, coming into contact with the stop member 36', automatically causes the side panel 26 to tilt or rotate outwards and consequently to automatically open the foaming cell.

From the comparison of FIGS. 2 and 5, it can be noticed that the rotation of the side panels 26 to close the cell, during the upwards movement of the frame 13, simply takes place by gravity, owing to the self-weight of the panels 26 and the particular geometric arrangement of the hinged point 31 that, as shown, lies in a vertical plane spaced apart from the panel 26, in the externally slanted position for opening the foaming cell.

Unlike the side panels 26, as shown in FIGS. 1 and 4, the two transversal panels 27 are movably supported by respective vertical posts 37, that downwardly protrude at the two ends of the cell 11, from the upper portion of the main frame 10; the lower ends of the posts 37 are further configured to engage a proper stop seat of the frame 13 and to be locked in said stop seat in the closed condition of the foaming cell shown in FIG. 1. Still from FIGS. 1 and 5, it is further noticed that the two transversal panels 27 are connected with the posts 37 by small connecting link 38, that enable the panels to downwardly move and laterally displace under the effect of their self-weight, during the opening of the foaming cell, as well to move in opposite directions during the closure of the cell, when urged against the frame 13.

The apparatus further comprises means, shown in FIGS. 2 and 8, for locking the side panels 26 in the closed condition of the cell 11; said locking means comprises a pin 40 at an end of a respective arm 41 fixed on the external side of each side panel 26; the pin 40 engages a downwardly open cavity 42 of a locking member 43, sliding along a guide 44 at the upper side of the main frame 10, by manually operating an adjusting screw 43', as a function of the position of each side panel 26, as shown in the enlarged detail of FIG. 8.

In the closed condition, the foaming cell 11 is further suitable for being connected to an air sucking source, not shown, for generating the vacuum level or underpressure required for aiding the polyurethane mixture, injected into the hollow walls of the refrigeration container 18, to foam.

As previously said, the shore panels 26, 27 are further provided with a system of sealing gaskets suitable for providing a sealing closure between said panels in an air tight condition, as well as between the panels 26, 27, the metallic plate 25 defining the upper sealing surface of the bottom pallet 20, and the bottom surface of upper closure plate 28.

In particular, as shown in FIG. 6, each side panel 26 is provided with a peripheral sealing gasket 45 along the edges thereof, press-fitted into a proper groove and configured to come into contact with flat sealing surfaces of the plate 25 of the pallet 20, the upper plate 28 for closing the cell, and the two transversal panels 27, whatever will be the adjusted position of the two side panels 26.

In consideration that, differently from the previous solutions, the side panels 26 now extend directly between the upper surface of the plate 25 of the pallet 20, and the bottom surface of the upper plate 28 that closes the cell, as well as that the sealing gaskets 45 are configured and arranged inside suitable seats along the peripheral edges of the side panels 26, in order to come into direct contact with flat surfaces of the plate 25 of the pallet 20 and the upper plate 28, as well as with flat surfaces of the transversal panels 27, the mutual distance between the side panels 26 can thus be changed in an adjustable manner in order to change the dimensions of the foaming cell, without maintenance and/or substituting operations of parts having to be carry out, and convenient tightly closure conditions of the cell 11 being at the same time assured.

FIGS. 1, 2 and 3 show a further characteristic of the apparatus according to the invention. As previously said, the apparatus according to the invention differs from the apparatuses previously known, in the capability of firmly varying and adjusting the transversal dimensions of the foaming cell 11, by supporting the side panels 26 so as to change the mutual distance depending on the dimensions of the model of refrigeration container to be foamed, as well as implementing a suitable system of sealing gaskets that enable the cell to be air-tightly closed in any working condition.

FIG. 7 shows in turn the position of the sealing gaskets 46 and 47 between a transversal panel 27, the plate 25 of the pallet 20, and the upper closure plate 28.

However, as the models of refrigeration containers vary in the time, so both the transversal and the longitudinal dimensions can vary.

According to another aspect of the invention, in order to prevent subsequent operations for adding and/or substituting parts on one or both the transversal panels 27, according to the present invention, internally to the cell 11, the application of an auxiliary shore panel 48 was provided, parallely extending to the transversal panels 27; the auxiliary shore panel 48 is supported by the main frame 10 so that the position of said auxiliary shore panel 48 can be firmly adjusted between a fully retracted position, against or near to a transversal panel 27, as shown in FIG. 1, and a fully advanced position; thus, the distance between the auxiliary panel 48 and the transversal panel 27, opposed to said auxiliary panel 48, can be adjusted depending on the longitudinal length of the container 18 to be foamed.

According to the considered example, the auxiliary internal shore panel 48 is supported, by means of connecting links 49, by two vertical posts 50, only one of which is shown in FIG. 1, that downwardly extend from a respective screw nut 51, moving along a screw 52 rotatably supported underlying the plate 28.

The two screws 52 can be driven to rotate for example by providing a driving transmission, actuated by a driving shaft 53.

FIG. 3 shows another characteristic of the internal auxiliary shore panel 48; actually, depending on the width dimensions of the container to be foamed, consequently depending on the mutual distance and position of the side panels 26, the internal auxiliary panel 48 can be differently dimensioned and shaped; for example, an intermediate panel of minimal width can be provided, equal to the width of a container 18 of minimal dimensions, to which intermediate panel lateral extension panels can be added and/or removed in order to adapt said composite auxiliary central panel to containers 18 of larger width.

The working of the apparatus will now be briefly explained: at the starting, the apparatus is supposed to lie with the cell in the open conditions of FIGS. 4 and 5, wherein the auxiliary frame 13 with the pallet 20 lie in the lowered position; the two side panels 26 are also supposed to lie in the retracted and tilted position shown FIG. 5. In these conditions, since the levers 30' of the hinging arms 30 of the side panels 26 are in contact with the stop members 36', the side panels 26 will appear tilted outwards; consequently, a container 18 to be foamed can be introduced, or an already foamed container 18 can be removed, by moving the pallet 20 by means of the roller conveyors 21A, 21B.

After a new container to be foamed, positioned in advance on the pallet 20, has been introduced into the cell 11, said cell can be closed by raising the frame 13 with the pallet 20 and the new container 18.

During the raising of the frame 13, since the levers 30' move apart from the stop members 36', the support arms 30 of the side panels 26 are free to rotate inside under the weight of said panels; as a consequence of the particular geometry and arrangement of the hinged points 31, the side panels 26 move inside to the vertical position of FIG. 2, abutting against the pallet 20.

As the upward movement of the pallet 20 continues, near the end of the travel, the pallet 20 comes into contact with the transversal panels 27, that, from the position of FIG. 4, move to the position of FIG. 1; at the end of the upward movement, the thrust exerted by the frame 13 will be such to press all the sealing gaskets of the panels against respective sealing surfaces, air-tightly closing the foaming cell 11.

At this point, after the required vacuum degree has been established within the cell, and consequently within the hollow walls of the refrigeration container, a polyurethane mixture can be injected and left free to expand within the hollow walls of the container, said polyurethane mixture being aided in said free expansion by the vacuum degree.

Once the injecting and foaming step is carried out, after the polyurethane foam has polymerised and hardened, the cell can be opened by reversing the movement of the frame 13, returning to the open condition of FIGS. 4 and 5, where the pallet 20 with the foamed container can be removed.

Suppose now that a model of container 18 of smaller width than the previous one has to be foamed; at this point, it is sufficient to move closer the slides 32 and consequently the side panels 26 and stop said slides 32 and said side panels 26 at a required position, for example at the position of maximal advancement shown in the left portion of FIG. 6, without the panels come to interfere with the pallet 20; at this point, the foaming cell 11 can be again tightly closed as previously disclosed.

Finally, when a refrigeration container has a length different from the length of a previously foamed container, also the position of an internal auxiliary shore panel 29 has to be adjusted, by always holding the foaming cell 11 in the open condition.

Thus, from what has been stated and shown, it will be understood that an apparatus has been provided for foaming under vacuum condition refrigeration containers; therefore, other changes or modifications can be made to the apparatus as a whole, the foaming cell or portions thereof, without departing from the claims.

The invention claimed is:

1. An apparatus for foaming under vacuum condition a container for refrigeration of foodstuffs, comprising:
    a main frame provided with vertically extending guide posts;
    an auxiliary frame horizontally extending and movably supported between a lower position and an upper position by the guide posts of the main frame;
    a foaming cell configured to air-tightly enclose the refrigeration container, the foaming cell comprising:
        a support pallet for the refrigeration container and side shore panels tiltably supported by the auxiliary frame;
        transversal panels and an internal shore plug member being supported by the main frame, in a position overlaying the auxiliary frame;
        first control means for moving the auxiliary frame with the pallet between the lower position and the upper position, in an open condition and a closed condition of the foaming cell, respectively; and
        sealing gaskets between the side shore panels, the pallet and an upper closure member,
    wherein the side shore panels are hingedly connected to slide members transversally movable to the auxiliary frame; and
    second control means for adjustably moving the slide members and the side shore panels between a retracted position and advanced positions in respect to the pallet;
    wherein each slide member is provided with a rocking arm which is coplanar to a corresponding one of the side shore panels and which includes a roller for contacting and sliding along a stop member so as to automatically cause the corresponding side shore panel to outwardly rotate by gravity and open the foaming cell in the lower position of the auxiliary frame,
    and wherein the sealing gaskets of the side shore panels are configured and positioned along peripheral edges of the side shore panels, to come into contact with flat inner sealing surfaces of the pallet, the transversal panels and the upper closure member, in any adjusted position between the retracted position and the advanced positions of the side shore panels of the cell.

2. The apparatus according to claim 1, wherein the pallet is movably supported by the auxiliary frame, and comprises control means for moving the pallet between an internal condition and an external condition in respect to the foaming cell.

3. The apparatus according to claim 1, further comprising;
    an internal auxiliary shore panel longitudinally movable along the foaming cell in respect to a transversal panel; and
    control means to move the internal shore panel between a refracted position and advanced positions in respect to said transversal panel.

4. The apparatus according to claim 3, wherein the internal auxiliary shore panel comprises removably fixed side extension panels.

5. The apparatus according to claim 1, wherein the sealing gaskets have a flat sealing surface to contact flat sealing surfaces of the pallet, the side panels and an upper closure member of the cell.

* * * * *